US011498467B2

(12) United States Patent
Ni

(10) Patent No.: US 11,498,467 B2
(45) Date of Patent: Nov. 15, 2022

(54) FASTENING ASSEMBLY

(71) Applicant: ILLINOIS TOOL WORKS INC., Glenview, IL (US)

(72) Inventor: Xiongbo Ni, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/319,472

(22) Filed: May 13, 2021

(65) Prior Publication Data
US 2021/0354608 A1 Nov. 18, 2021

(30) Foreign Application Priority Data

May 18, 2020 (CN) .......................... 202010420210.1
May 8, 2021 (CN) .......................... 202110501781.2

(51) Int. Cl.
*B60N 2/68* (2006.01)
*F16B 2/22* (2006.01)

(52) U.S. Cl.
CPC ................ *B60N 2/682* (2013.01); *F16B 2/22* (2013.01)

(58) Field of Classification Search
CPC ........ F16B 2/22; F16B 21/075; F16B 21/076; F16B 21/065; Y10T 24/44026; Y10T 24/309; B60N 2/01508
See application file for complete search history.

(56) References Cited

U.S. PATENT DOCUMENTS

| 4,916,778 | A | * | 4/1990 | Iguchi | ................... | F16B 21/076 |
| | | | | | | 24/457 |
| 5,606,784 | A | * | 3/1997 | Hamamoto | ........... | F16B 21/075 |
| | | | | | | 410/116 |
| 6,474,616 | B2 | * | 11/2002 | Yamada | ................. | B60N 2/682 |
| | | | | | | 296/43 |
| 10,780,797 | B2 | * | 9/2020 | Hattori | ..................... | B60N 2/90 |

* cited by examiner

*Primary Examiner* — Robert Sandy
(74) *Attorney, Agent, or Firm* — Quarles & Brady LLP

(57) ABSTRACT

A fastening assembly includes a receiving seat and a clip having an operation portion, a holding portion, an insertion portion, and a pair of connection leg portions. The receiving seat includes a neck portion and a receiving channel. The insertion portion connects to the operation portion by the pair of connection leg portions, and the holding portion connects to the operation portion. When the clip is mounted on the neck portion of the receiving seat, the insertion portion of the clip is at least partially inserted into the receiving channel through the opening in a first neck portion side wall, and the holding portion of the clip abuts against a second neck portion side wall. When a pushing force is applied to the operation portion toward the neck portion, the insertion portion can be withdrawn from the receiving channel, such that the clip can be removed from the receiving seat.

10 Claims, 6 Drawing Sheets

FASTENING ASSEMBLY

CROSS REFERENCES TO RELATED APPLICATIONS

This application claims the benefit of Chinese Patent Application No. 202010420210.1, filed on May 18, 2020, and Chinese Patent Application No. 202110501781.2, filed on May 8, 2021, both of which are incorporated herein by reference in their entirety.

TECHNICAL FIELD

The present disclosure relates to the technical field of fastening assemblies, and in particular to a fastening assembly for mounting a vehicle seat to a metal plate inside a vehicle.

BACKGROUND

A vehicle seat often needs to be connected to a metal plate by means of a fastening assembly for securing the vehicle seat on the metal plate inside the vehicle. However, when a vehicle needs to be serviced or maintained, the vehicle seat needs to be removed from the metal plate inside the vehicle. The existing fastening assembly cannot satisfy the requirement of not only ensure the secured connection between the vehicle seat and the metal plate inside the vehicle, but also facilitate the removal operation between the vehicle seat and the metal plate inside the vehicle.

SUMMARY OF THE DISCLOSURE

The present disclosure provides a fastening assembly, which can not only realize the effective connection between a connector of a vehicle seat and a metal plate inside a vehicle, but also facilitate a user to remove the connector of the vehicle seat from the metal plate inside the vehicle when needed.

The fastening assembly according to the present disclosure comprises a receiving seat and a clip. The receiving seat comprises a neck portion, a body portion and a receiving channel, wherein the body portion is connected to the neck portion, the receiving channel extends through the neck portion, the neck portion comprises a first neck portion side wall and a second neck portion side wall located on opposite sides of the receiving channel and an opening arranged in the first neck portion side wall, and the opening is in communication with the receiving channel. The clip comprises an operation portion, a holding portion, an insertion portion, and a pair of connection leg portions. The insertion portion is connected to the operation portion by means of the pair of connection leg portions, and the holding portion is connected to the operation portion. The holding portion and the pair of connection leg portions are elastic, and the clip is configured to be removably clamped on the neck portion of the receiving seat. When the clip is mounted in place on the neck portion of the receiving seat, the insertion portion of the clip is at least partially inserted into the receiving channel through the opening in the first neck portion side wall, and the holding portion of the clip abuts against the second neck portion side wall of the neck portion. By means of applying a pushing force to the operation portion toward the neck portion, the insertion portion can be withdrawn from the receiving channel of the receiving seat, such that the clip can be removed from the receiving seat.

According to the fastening assembly described above, each connection leg portion of the pair of connection leg portions comprises a transverse branch leg connected to the insertion portion and a longitudinal branch leg connected between the transverse branch leg and the operation portion, wherein the longitudinal branch leg, the transverse branch leg and the holding portion define a receiving opening, and the clip is clamped on the neck portion of the receiving seat through the receiving opening.

According to the fastening assembly described above, the longitudinal branch leg comprises a curved section close to the transverse branch leg, and the curved section is curved toward the insertion portion.

According to the fastening assembly described above, the holding portion has a compressible structure.

According to the fastening assembly described above, the compressible structure comprises at least two annular structures, the at least two annular structures are connected between the pair of connection leg portions, and one of the at least two annular structures abuts against the second neck portion side wall of the neck portion.

According to the fastening assembly described above, the insertion portion comprises an insertion section, the insertion section can be inserted into the receiving channel through the opening in the first neck portion side wall, and a top face of a free end of the insertion section is an inclined face that is gradually inclined downward toward an end face of the free end.

According to the fastening assembly described above, the insertion portion further comprises a support section, the insertion section is connected to the support section, the support section is connected to the pair of connection leg portions, and the size of the support section is greater than that of the opening, such that the support section will not be inserted into the receiving channel along with the insertion section.

According to the fastening assembly described above, the insertion portion further comprises a protruding portion extending out from the end face of the free end of the insertion section, and the second neck portion side wall is further provided with an accommodation hole, wherein, when the clip is mounted in place on the neck portion of the receiving seat, the protruding portion is received in the accommodation hole.

According to the fastening assembly described above, the clip is integrally formed of a plastic material.

According to the fastening assembly described above, the receiving channel of the receiving seat is used for receiving a connector that has a U-shaped connection portion.

BRIEF DESCRIPTION OF THE DRAWINGS

These and other features and advantages of the present disclosure may be better understood by reading the following detailed description with reference to the accompanying drawings. The same reference numerals represent the same components throughout the accompanying drawings, in which.

DETAILED DESCRIPTION OF EMBODIMENTS

Various specific embodiments of the present disclosure are described below with reference to the accompanying drawings which constitute part of this description. It should be understood that although the terms such as "front", "rear", "upper", "lower", "left", "right", "top" and "bottom" indicating directions in the present disclosure are used to describe various exemplary structural parts and elements in the present disclosure, these terms used herein are merely used for ease of description and are determined based on the exemplary orientation shown in the accompanying drawings. Since the embodiments disclosed in the present disclosure can be arranged in different directions, these terms indicating directions are only illustrative and should not be considered as limitations.

Figure 1:
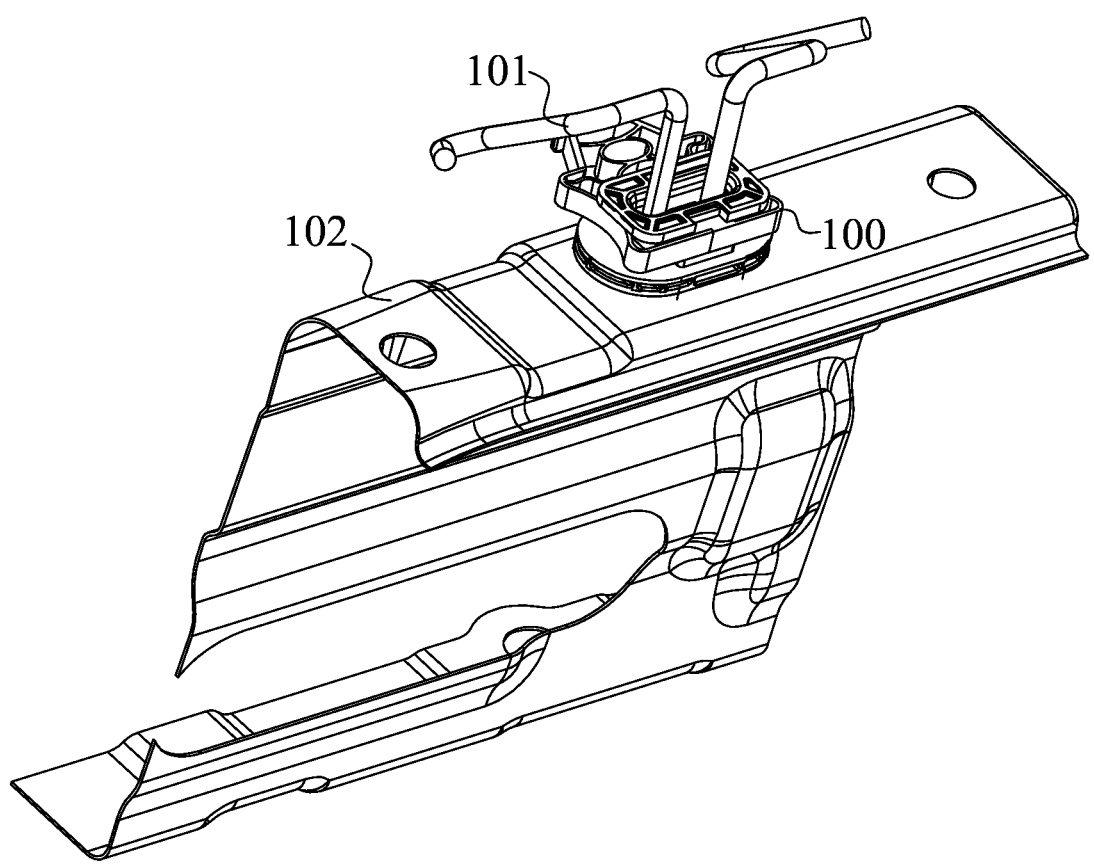
FIG. 1 shows a structure in which a fastening assembly according to an embodiment of the present disclosure is used to connect a connector of a vehicle seat with a metal plate inside a vehicle.
Figure 2:
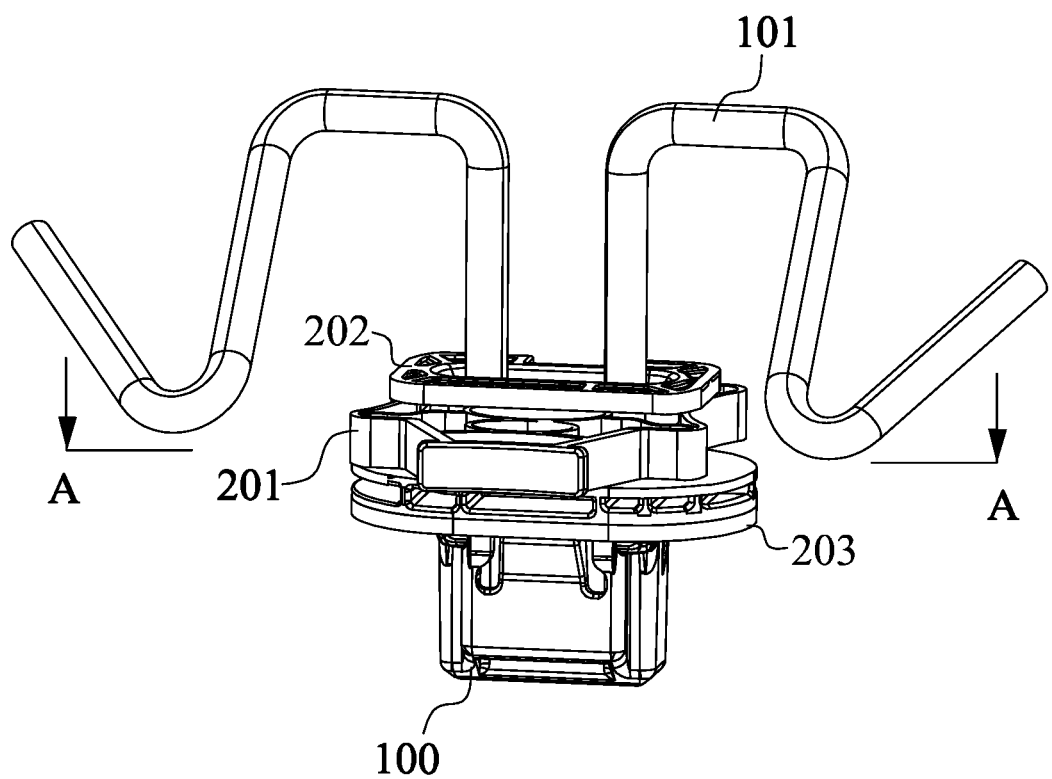
FIG. 2 shows a cooperating structure between the fastening assembly and the connector in FIG. 1.

FIG. 1 shows a structure in which a fastening assembly 100 according to an embodiment of the present disclosure is used to connect a connector 101 of a vehicle seat with a metal plate 102 inside a vehicle, and FIG. 2 shows a cooperating structure between the fastening assembly 100 and the connector 101 in FIG. 1. As shown in FIGS. 1 and 2, the metal plate 102 inside the vehicle is provided with a mounting hole (the mounting hole is hidden by the fastening assembly 100 and is invisible), and the fastening assembly 100 is mounted on the metal plate 102 inside the vehicle through the mounting hole. The connector 101 of the vehicle seat is partially inserted into the fastening assembly 100, and is fastened to the metal plate 102 inside the vehicle by means of the connection with the fastening assembly 100. As shown in FIG. 2, the fastening assembly 100 comprises a receiving seat 202, a clip 201 and a gasket 203, with both the clip 201 and the gasket 203 being connected to the receiving seat 202 to achieve the fastening and mounting function of the fastening assembly 100.

Figure 3:
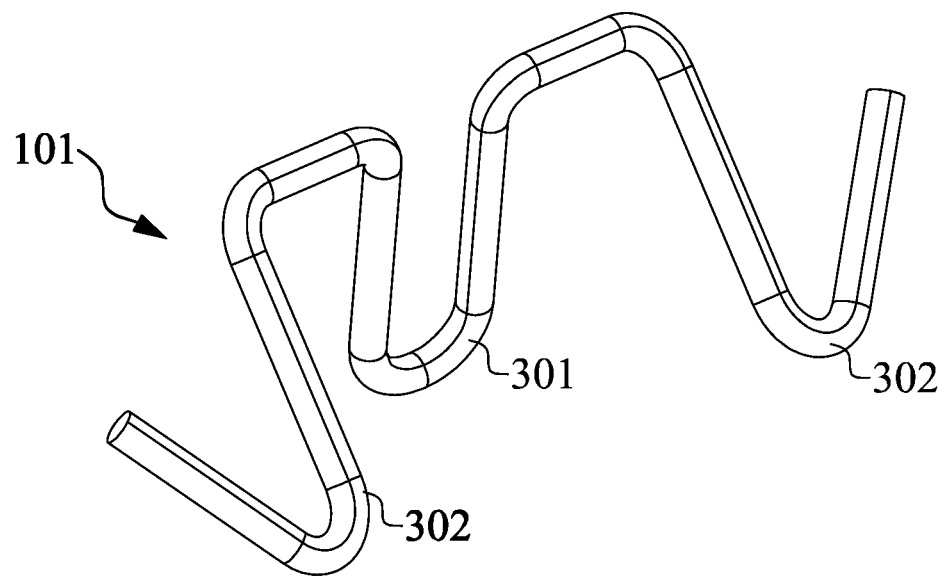
FIG. 3 is a perspective view of the connector in FIG. 2.

FIG. 3 is a perspective view of the connector 101 in FIG. 2. As shown in FIG. 3, the connector 101 is curved elongated-shaped, which comprises a U-shaped connection portion 301 and two hook portions 302. The hook portions 302 and the U-shaped connection portion 301 are formed by bending an elongated-shaped metal wire. In this embodiment, the connector 101 is formed by means of bending a steel wire. The two hook portions 302 are connected to left and right ends of the U-shaped connection portion 301 for connection to the frame of the vehicle seat. The U-shaped connection portion 301 is configured to be inserted into the fastening assembly 100.

Figure 4:
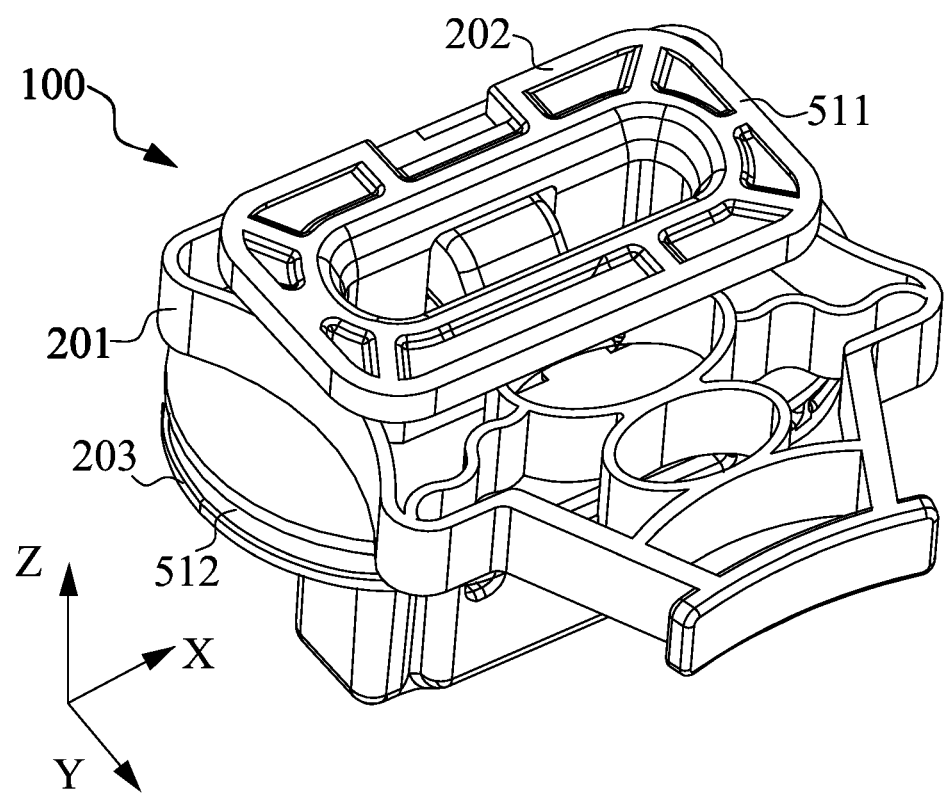
FIG. 4 is a perspective view of the fastening assembly in FIG. 2.

FIG. 4 is a perspective view of the fastening assembly 100 in FIG. 2. As shown in FIG. 4, the fastening assembly 100 can be inserted into the mounting hole of the metal plate 102 inside the vehicle from top to bottom in the Z-axis direction. The receiving seat 202 generally extends in the Z-axis direction. The clip 201 is connected to an upper position of the receiving seat 202 and generally extends along a plane defined by the X axis and the Y axis. The clip 201 and the receiving seat 202 cooperate with each other and can hold the connector 101 in the fastening assembly 100. The gasket 203 also generally extends along the plane defined by the X axis and the Y axis. As can be seen in conjunction with FIG. 1, when the fastening assembly 100 is mounted on the metal plate 102 inside the vehicle, the gasket 203 is located between the receiving seat 202 and the metal plate 102 inside the vehicle.

Figure 5A:
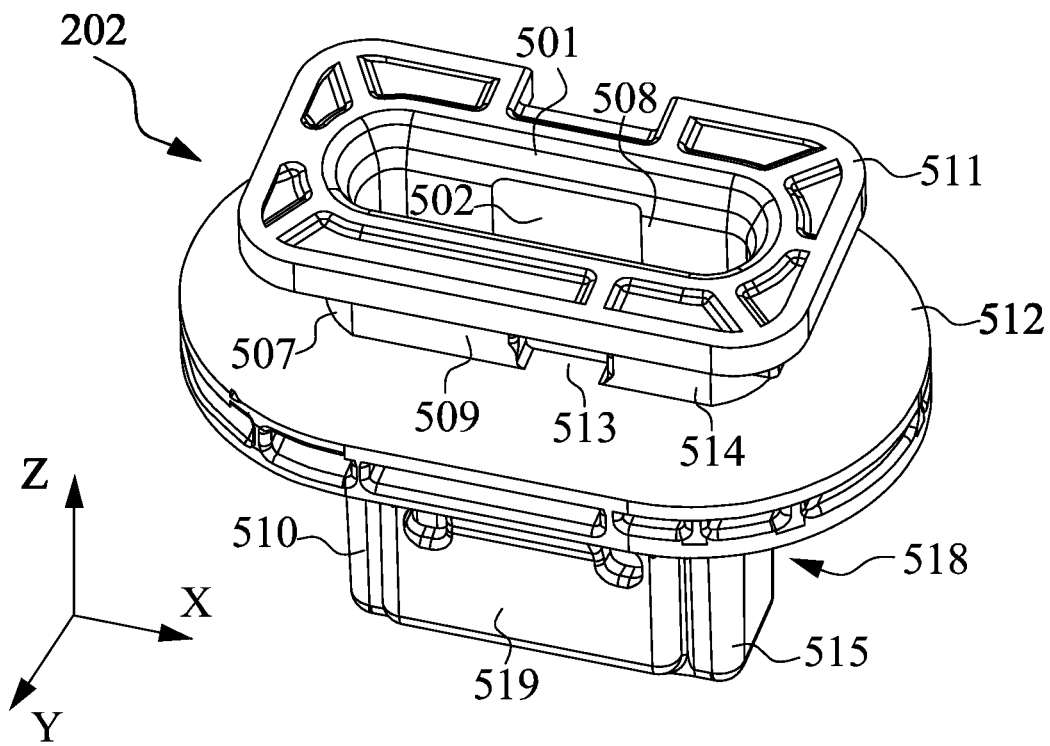
FIG. 5A is a perspective view of a receiving seat in FIG. 4 from a first perspective.
Figure 5B:
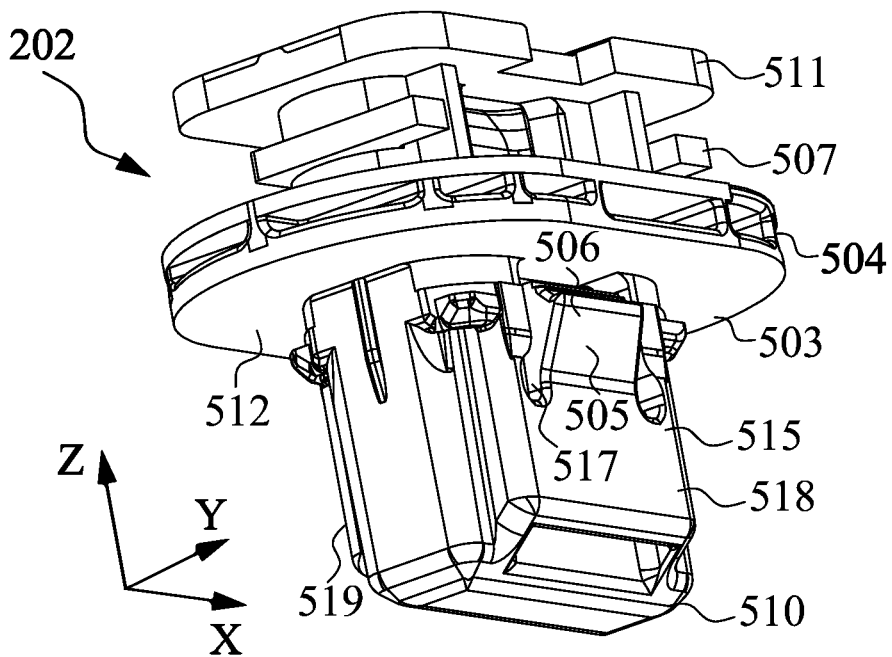
FIG. 5B is a perspective view of the receiving seat in FIG. 4 from a second perspective.

FIGS. 5A and 5B are perspective views of the receiving seat 202 in FIG. 4 from two different perspectives respectively. As shown in FIGS. 5A and 5B, the receiving seat 202 comprises a neck portion 507, and a body portion 510 that is located below the neck portion 507 and connected to the neck portion 507. The receiving seat 202 further comprises a receiving channel 501 for receiving the U-shaped connection portion 301 of the connector 101, and the receiving channel 501 extends through the neck portion 507 in the Z-axis direction and extends into the body portion 510. The receiving channel 501 does not extend through the body portion 510. The receiving seat 202 further comprises a first flange 511 and a second flange 512 which are respectively arranged around the top end and the bottom end of the neck portion 507, and the first flange 511 and the second flange 512 extend outward from the neck portion 507. The first flange 511 is located at the top end of the neck portion 507, and the second flange 512 is located at the bottom end of the neck portion 507. The first flange 511 is generally square and has a structure that is hollowed out in the thickness direction thereof (the Z-axis direction). The second flange 512 is generally elliptical, with the size of the outer contour thereof being greater than the size of the outer contour of the first flange 511. An inlet of the receiving channel 501 is formed at the top end of the neck portion 507, and the U-shaped connection portion 301 of the connector 101 is inserted into the receiving channel 501 from the inlet of the receiving channel 501. The clip 201 can be clamped on the portion of the neck portion 507 that is located between the first flange 511 and the second flange 512. The body portion 510 is located below the second flange 512, and the body portion 510 has a contour that corresponds to the mounting hole of the vehicle inside metal plate 102, and is used for securing the fastening assembly 100 in the mounting hole of the metal plate 102 inside the vehicle.

As shown in FIG. 5A, the receiving channel 501 extends downward from the top face of the receiving seat 202 (i.e., the top face of the neck portion 507). The extension direction of the receiving channel 501 is defined as first direction, and in this embodiment, the first direction is the Z-axis direction. The cross section of the receiving channel 501 is elongated-shaped, and the extension direction of the elongated-shaped cross section is consistent with the X-axis direction. The length of the cross section of the receiving channel 501 is greater than the width of the U-shaped connection portion 301 of the connector 101, such that the U-shaped connection portion 301 can be inserted into the receiving channel 501.

The neck portion 507 comprises a side wall 514 surrounding the receiving channel 501. The side wall 514 comprises a first neck portion side wall 508 and a second neck portion side wall 509 which are arranged opposite each other, and the first neck portion side wall 508 and the second neck portion side wall 509 are respectively located on opposite sides of the receiving channel 501. The first neck portion side wall 508 and the second neck portion side wall 509 both extend in the X-axis direction and are arranged in parallel. The first neck portion side wall 508 is provided with an opening 502, the opening 502 is located in the middle of the lengthwise direction of the first neck portion side wall 508, and the opening 502 extends through the first neck portion side wall 508 in the thickness direction of the first neck portion side wall 508. The second neck portion side wall 509 is provided with an accommodation hole 513, the accommodation hole 513 extends through the second neck portion side wall 509 in the thickness direction of the second neck portion side wall 509, and the accommodation hole 513 has a size less than that of the opening 502. The structures of the opening 502 and the accommodation hole 513 correspond to the structure of part of the clip 201 so as to accommodate the structure of the part of the clip 201, which will be described in detail below. The first flange 511 and the second flange 512 are separately formed by extending outward from the outer surface of the side wall 514, and are separately arranged surrounding the side wall 514 of the neck portion 507. Lower edges of the opening 502 and the accommodation hole 513 are separately flush with the upper surface of the second flange 512.

The body portion 510 extends downward from the neck portion 507. In this embodiment, the body portion 510 also generally extends in the Z-axis direction. Since the receiving channel 501 extends into the body portion 510, the body portion 510 is formed as a housing structure that is hollow inside. As shown in FIG. 5A, corresponding to the first neck portion side wall 508 and the second neck portion side wall 509 arranged opposite each other of the neck portion 507, the body portion 510 also has a first body portion side wall 518 and a second body portion side wall 519 arranged opposite each other. A pair of windows 517 are symmetrically arranged in the first body portion side wall 518 and the second body portion side wall 519. The body portion 510 further comprises a pair of elastic arms 505, and the pair of windows 517 are configured to respectively accommodate the pair of elastic arms 505. The bottom ends of the pair of elastic arms 505 are respectively connected to the bottom edges of the pair of windows 517, and the top ends of the pair of elastic arms 505 are formed as free ends 506. The above configuration enables the pair of elastic arms 505 to respectively move in an expansion and contraction motion relative to the first body portion side wall 518 and the second body portion side wall 519. When the pair of elastic arms 505 are pressed under an external force, the pair of elastic arms 505 can respectively pivot around the bottom end thereof toward the body portion 510 to cause the free ends 506 thereof to enter the windows 517; and when the external force is removed, the pair of elastic arms 505 return to the free state thereof, with the free ends 506 thereof extending out from the windows 517 and respectively protruding outward from the first body portion side wall 518 and the second body portion side wall 519. The configuration of the pair of elastic arms 505 enables the fastening assembly 100 to be removably connected to the mounting hole of the metal plate 102 inside the vehicle.

Figure 6A:
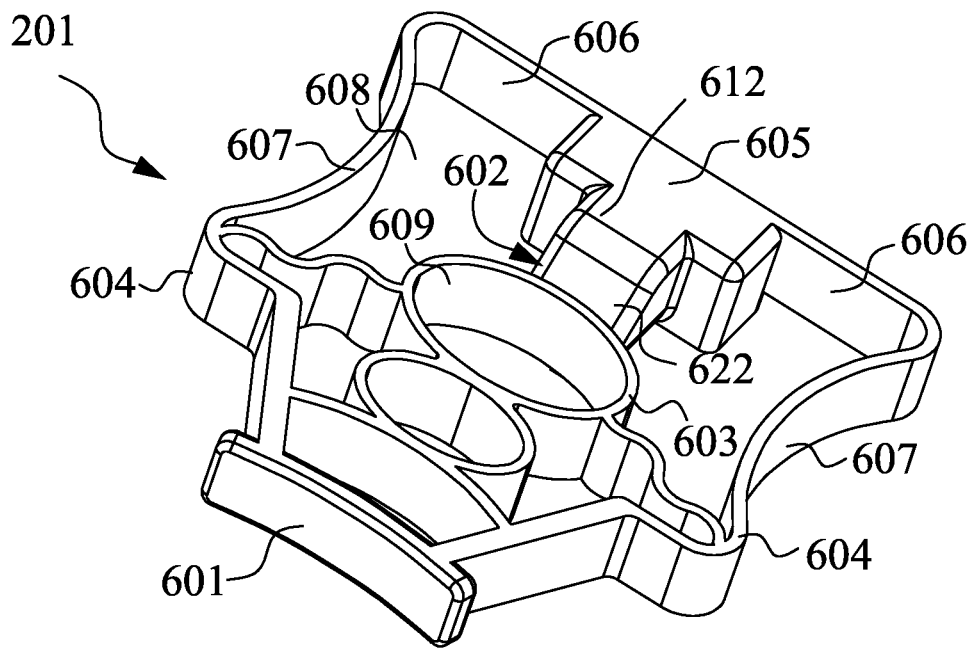
FIG. 6A is a perspective view of a clip in FIG. 4 from a first perspective.
Figure 6B:
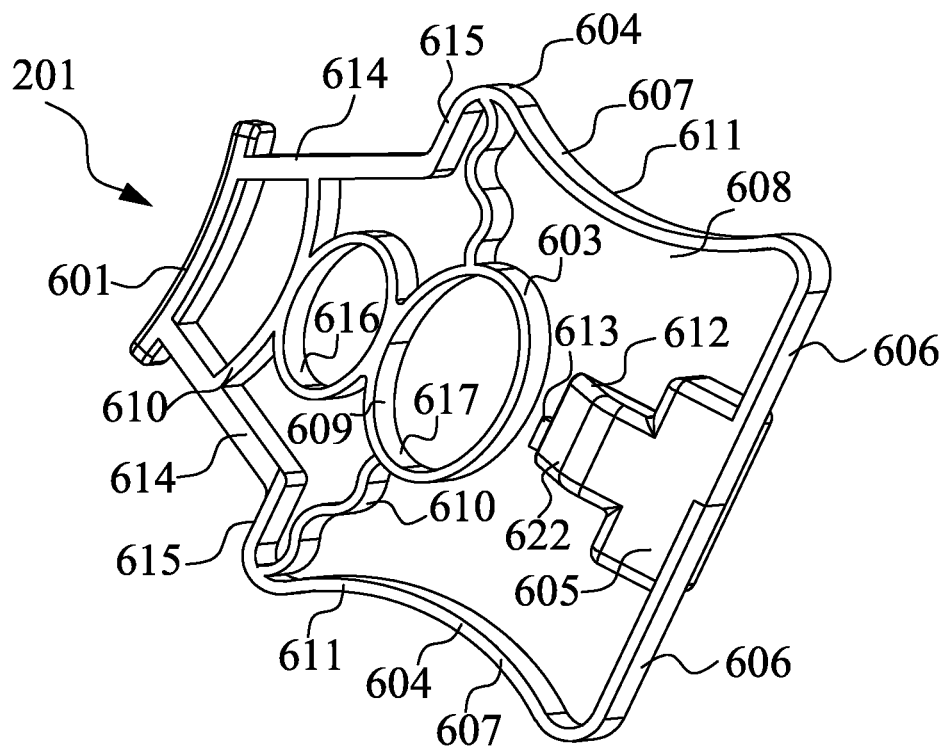
FIG. 6B is a perspective view of the clip in FIG. 4 from a second perspective.

FIGS. 6A and 6B are respectively perspective views of the clip 201 in FIG. 4 from different perspectives. As shown in FIGS. 6A and 6B, the clip 201 comprises an operation portion 601, a holding portion 603, an insertion portion 602, and a pair of connection leg portions 604. The clip 201 is generally elastic. In this embodiment, the clip 201 is integrally formed of a plastic material. The insertion portion 602 and the operation portion 601 are located at opposite ends of the clip 201. The operation portion 601 is generally strip-shaped, and has an external operation face that is slightly concaved inward, which can facilitate the user to apply pressure to the clip 201. The insertion portion 602 comprises an insertion section 612 and a support section 605, a connection end of the insertion section 612 is connected to the support section 605, and the support section 605 is connected to the pair of connection leg portions 604. A top face 622 of a free end of the insertion section 612 is an inclined face that is gradually inclined downward toward an end face of the free end. The insertion section 612 is sized such that the insertion section 612 can be inserted into the opening 502 in the first neck portion side wall 508, and the support section 605 has a size greater than that of the insertion section 612 and is sized such that the support section 605 cannot be inserted into the opening 502 in the first neck portion side wall 508. The free end of the insertion section 612 is further provided with a protruding portion 613, and the protruding portion 613 is formed by extending outward from the end face of the free end of the insertion section 612. The protruding portion 613 has a size much less than that of the insertion section 612, and the configuration of the protruding portion 613 facilitates better holding the U-shaped connection portion 301 of the connector 101 in the receiving seat 202. In some embodiments, the protruding portion 613 may not be provided. As for the embodiment in which the end of the insertion portion 602 is not provided with the protruding portion 613, the receiving seat 202 is not necessary to provide, on the second neck portion side wall 509 of the neck portion 507, with an accommodation hole 513 for accommodating the protruding portion 613.

The pair of connection leg portions 604 are respectively located on the left and right sides of the operation portion 601. Each of the connection leg portions 604 comprises a transverse branch leg 606 and a longitudinal branch leg 607, and the transverse branch leg 606 and the longitudinal branch leg 607 of each connection leg portion 604 are connected together by a smooth transition. The pair of transverse branch legs 606 extend in the same direction, and are connected to the side of the support section 605 of the insertion portion 602 that faces away from the insertion portion 602. The pair of longitudinal branch legs 607 are respectively connected to the left and right sides of the operation portion 601, and each of the longitudinal branch legs 607 comprises an inclined section 614 and a curved section 611. The inclined section 614 of the longitudinal branch leg 607 obliquely extends outward from the inner surface of the operation portion 601. The curved section 611 of the longitudinal branch leg 607 is arranged close to the transverse branch leg 606, and the curved section 611 is curved toward the insertion portion 602. The inclined section 614 and the curved section 611 of the longitudinal branch leg 607 are connected by a branch leg transverse section 615. The operation portion 601 are connected to the pair of connection leg portions 604 to form a ring, and together form the outer contour of the clip 201.

The holding portion 603 comprises at least two annular structures 609 and is connected to the inner side of the operation portion 601. In this embodiment, the holding portion 603 comprises two annular structures 609 connected to each other. The two annular structures 609 are both elliptical, and include a large holding ring 617 and a small holding ring 616. The large holding ring 617 is arranged close to the insertion portion 602, and the small holding ring 616 is arranged close to the operation portion 601. The two annular structures 609 are connected to the pair of connection leg portions 604 by means of a plurality of connection strips 610. The small holding ring 616 is connected to the inner surface of the pair of inclined sections 614 by means of arc-shaped connection strips 610, and the large holding ring 617 is connected to the junction of the branch leg transverse section 615 of the longitudinal branch leg 607 and the curved section 611 by means of a pair of waved connection strips 610. As such, the large holding ring 617 and the small holding ring 616 are held between the pair of connection leg portions 604 by means of the plurality of connection strips 610. The plurality of annular structures 609 of the holding portion 603 are provided such that the holding portion 603 is elastic and can be compressed under an external force. In other embodiments, the holding portion 603 can also be configured as a web structure of other types, as long as it can be compressed under an external force. As shown in FIG. 6B, the pair of longitudinal branch legs 607, the pair of transverse branch legs 606, and the holding portion 603 define a receiving opening 608. The receiving opening 608 is located inside the outer contour of the clip 201 for receiving the neck portion 507 of the receiving seat 202 such that the clip 201 can be clamped on the neck portion 507 of the receiving seat 202.

Figure 7:
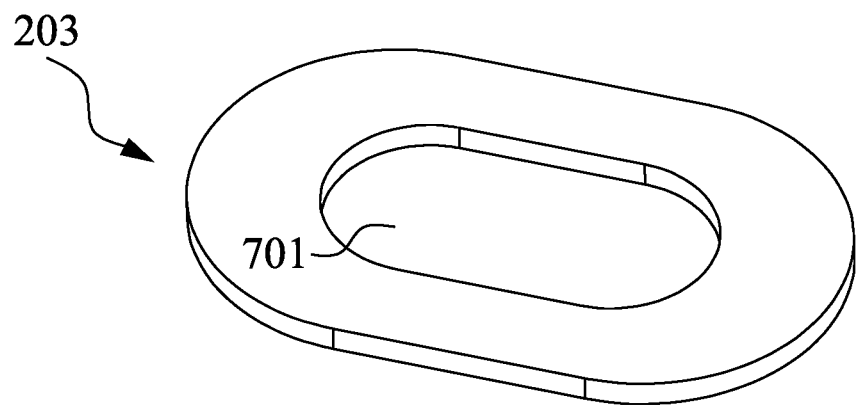
FIG. 7 is a perspective view of a gasket in FIG. 4.

FIG. 7 is a perspective view of the gasket 203 in FIG. 4. As shown in FIG. 7, the gasket 203 is annular-shaped, with a gasket center hole 701 in the center. The gasket 203 has an overall shape corresponding to the shape of the second flange 512, such that the center hole 701 of the gasket 203 can receive the body portion 510 of the receiving seat 202 to enable the gasket 203 to come into contact with the lower surface of the second flange 512 of the receiving seat 202. The gasket 203 is made of an elastic material, can provide a buffering effect between the receiving seat 202 and the metal plate 102 inside the vehicle, and has the functions of shock resistance and noise reduction. In this embodiment, the gasket 203 is made of a foam material. In other embodiments, the gasket 203 may also be made of other elastic materials.

Figure 8:
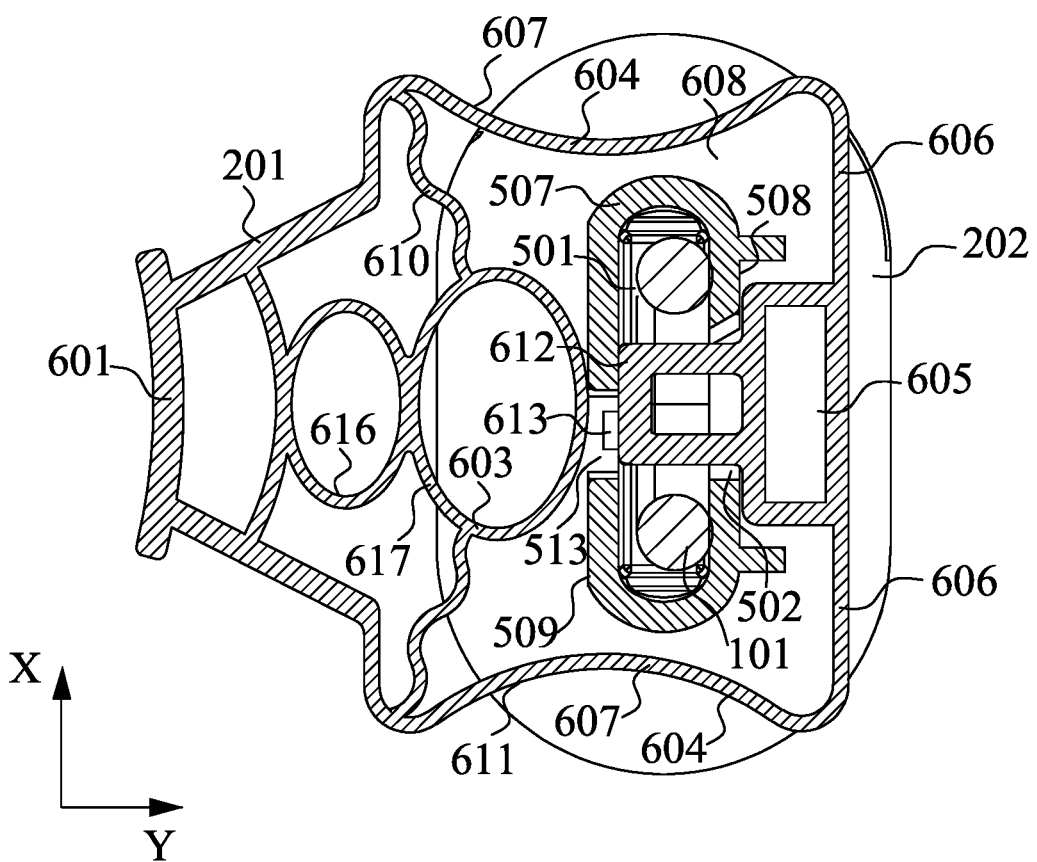
FIG. 8 is a cross-sectional view of the fastening assembly connected with the connector along line A-A in FIG. 2.

FIG. 8 is a cross-sectional view of the fastening assembly 100 connected with the connector along line A-A in FIG. 2, showing the cooperation relationship between the clip 201 and the receiving seat 202 when the clip is mounted in place on the receiving seat. As shown in FIG. 8, the insertion section 612 and the support section 605 of the insertion portion 602 both have a hollow structure. The clip 201 is clamped on the neck portion 507 of the receiving seat 202, and the neck portion 507 is accommodated in the receiving opening 608 of the clip 201. The insertion section 612 of the clip 201 is at least partially inserted into the receiving channel 501 through the opening 502 in the second direction. In this embodiment, the second direction is the Y-axis direction. The length of the insertion section 612 extending in the Y-axis direction corresponds to the width of the receiving channel 501 such that the insertion section 612 can extend across the width direction of the receiving channel 501. The end face of the free end of the insertion section 612 abuts against the inner surface of the second neck portion side wall 509 of the neck portion 507, and the protruding portion 613 on the insertion section 612 is accommodated in the accommodation hole 513 of the neck portion 507. The support section 605 has a size greater than that of the opening 502, and thus the support section 605 cannot be inserted into the opening 502, but abuts against the outer surface of the first neck portion side wall 508 of the neck portion 507 by means of the outer wall thereof that is closer to the side of the insertion section 612. The configuration of the support section 605 enlarges the size of the receiving opening 608 in the clip 201 and enhances the overall elasticity of the clip 201. When the clip 201 is mounted in place on the neck portion 507 of the receiving seat 202, the insertion section 612 of the clip 201 is inserted into the opening 502 of the neck portion 507 of the receiving seat 202, and the holding portion 603 of the clip 201 abuts against the second neck portion side wall 509 of the neck portion 507, and the holding portion 603 is in a compressed state, such that the motion of the clip 201 relative to the receiving seat 202 in the X-axis and Y-axis directions is restricted. Also, in conjunction with FIG. 4, it can be seen that the spacing between the first flange 511 and the second flange 512 corresponds to the thickness of the clip 201, such that the receiving seat 202 can restrict the motion of the clip 201 relative to the receiving seat 202 in the Z-axis direction. As such, the clip 201 is fastened on the receiving seat 202.

In conjunction with FIGS. 4 to 8, it can be seen that, in order to connect the clip 201 to the receiving seat 202, the insertion section 612 of the insertion portion 602 of the clip 201 can be first inserted into the receiving channel 501 of the receiving seat 202 via the opening 502 of the receiving seat 202. Then, the curved sections 611 of the pair of connection leg portions 604 of the clip 201 are simultaneously pulled outward, and the clip 201 is pressed downward. The holding portion 603 of the clip 201 is pressed by the outer edge of the first flange 511 to contract inward, such that the receiving opening 608 in the clip 201 is enlarged to allow the first flange 511 to pass through. When the clip 201 passes the first flange 511 and reaches the neck portion 507 of the receiving seat 202, the holding portion 603 of the clip 201 is gradually released from a state of being greatly compressed to a state of abutting against the second neck portion side wall 509 of the neck portion 507. As such, the clip 201 is mounted in place on the receiving seat 202.

In conjunction with FIG. 1, it can be seen that, in order to connect the connector 101 of the vehicle seat to the metal plate 102 inside the vehicle, the fastening assembly 100 is first mounted on the metal plate 102 inside the vehicle, and then the connector 101 is inserted into the fastening assembly 100. During the mounting of the fastening assembly 100 to the metal plate 102 inside the vehicle, firstly, the body portion 510 of the fastening assembly 100 is aligned with the mounting hole in the metal plate 102 inside the vehicle. As the fastening assembly 100 continuously moves downward under an external force, the pair of elastic arms 505 on the receiving seat 202 are pressed by the hole wall of the mounting hole in the metal plate 102 inside the vehicle to contract inward. When the pair of elastic arms 505 move downward to a position below the mounting hole in the metal plate 102 inside the vehicle, the free ends 506 of the pair of elastic arms 505 are ejected outward and abut against the lower surface of the metal plate 102 inside the vehicle. At this time, the gasket 203 of the fastening assembly 100 abuts against the upper surface of the metal plate 102 inside the vehicle. The height of the spacing between the gasket 203 and the free end 506 of the elastic arm 505 is approximately the same as the thickness of the metal plate 102 inside the vehicle, and the size of the mounting hole of the metal plate 102 inside the vehicle corresponds to the size of the cross-section of the fastening assembly 100 at the position of the body portion 510, such that when the fastening assembly 100 is mounted in place on the metal plate 102 inside the vehicle, the fastening assembly 100 can be held relatively fixed with respect to the metal plate 102 inside the vehicle in three directions of X-axis, Y-axis and Z-axis.

During the connection of the connector 101 and the fastening assembly 100, firstly, the U-shaped connection portion 301 of the connector 101 is aligned with the receiving channel 501 of the receiving seat 202 of the fastening assembly 100. During the insertion of the U-shaped connection portion 301 of the connector 101 into the receiving channel 501 gradually from top to bottom along the Z axis, the bottom of the U-shaped connection portion 301 will come into contact with the top face 622 of the insertion section 612 of the clip 201. Due to the inclined design of the top face 622 of the insertion section 612, the insertion section 612 is subjected to a rightward pushing force applied by the U-shaped connection portion 301. Since the insertion section 612 is connected to the pair of connection leg portions 604 which are elastic, and the holding portion 603 can be compressed, the insertion section 612 can move rightward under the pushing force. As the insertion section 612 gradually moves rightward, the insertion section 612 is gradually withdrawn from the receiving channel 501 so as to be out of the way, such that the bottom of the U-shaped connection portion 301 can move through the insertion section 612 and continue to move downward, and reach a position below the insertion section 612.

After the bottom of the U-shaped connection portion 301 reaches a position below the insertion section 612, the insertion section 612 is no longer subjected to the rightward force applied by the bottom of the U-shaped connection portion 301, and thus the insertion section 612 moves leftward under an elastic force of the pair of connection leg portions 604, and restores to the state of extending across the entire width of the receiving channel 501. As such, the insertion section 612 hooks the U-shaped connection portion 301 like a hook, such that the U-shaped connection portion 301 cannot be pulled upward out of the receiving channel 501, such that the connector 101 is mounted in place in the fastening assembly 100.

It can be seen from FIG. 8 that when the connector 101 is mounted in place in the fastening assembly 100, the bottom of the U-shaped connection portion 301 is located below the insertion section 612, and the protruding portion 613 is located in the accommodation hole 513 in the second neck portion side wall 509. Also, the holding portion 603 of the clip 201 abuts against the second neck portion side wall 509 of the neck portion 507, the holding portion 603 is in a compressed state, and thus the motion of the clip 201 in the X-axis and Y-axis directions relative to the receiving seat 202 is restricted. As such, the insertion section 612 can prevent the U-shaped connection portion 301 from leaving the fastening assembly 100 due to disengagement from the receiving channel 501, thereby achieving a fastening connection between the connector 101 and the fastening assembly 100. In the state shown in FIG. 8, even if the U-shaped connection portion 301 is pulled upward, the U-shaped connection portion 301 cannot be disengaged from the receiving channel 501, because the insertion section 612 blocks the path of disengagement thereof, and the cooperation of the protruding portion 613 and the accommodation hole 513 better holds the insertion section 612 in the position shown in FIG. 8.

When the connector 101 needs to disengage from the fastening assembly 100 such that the vehicle seat can be removed from the metal plate 102 inside the vehicle, as shown in FIG. 8, a pushing force in the Y-axis direction (that is, rightward) can be applied to the operation portion 601 of the clip 201, that is, a pushing force toward the neck portion 507 of the receiving seat 202 is applied to the operation portion 601. Since the operation portion 601 is connected to the holding portion 603, the operation portion 601 immediately transfers the rightward pressure to the holding portion 603. Since the right end of the holding portion 603 abuts against the second neck portion side wall 509 of the neck portion 507 of the receiving seat 202, the holding portion 603 is compressed under the rightward pressure, and the operation portion 601 moves rightward as the holding portion 603 is compressed. Since the operation portion 601 is connected to the pair of connection leg portions 604, the pair of connection leg portions 604 moves rightward together with the operation portion 601. At the same time, the pair of connection leg portions 604 also drives the insertion portion 602, which is connected to the connection leg portion 604, to move rightward. When the insertion portion 602 moves rightward to a position where the insertion section 612 thereof is completely withdrawn from the receiving channel 501, the insertion portion 602 will no longer prevent the U-shaped connection portion 301 of the connector 101 from disengaging from the receiving channel 501. At this time, the connector 101 can freely disengage from the fastening assembly 100. It can be seen from the above that when the connector 101 needs to be disengaged from the fastening assembly 100, only a pushing force needs to be applied to the operation portion 601 of the clip 201 of the fastening assembly 100.

The structural design of the receiving seat 202 and the clip 201 of the fastening assembly 100 of the present disclosure can not only realize the fastening connection between the connector 101 and the fastening assembly 100, but also facilitate the removal of the connector 101 from the fastening assembly 100, to release the connector 101 from the clip 201, the operator only needs to simply apply a pushing force (or a pressing force) to the operation portion 601 of the clip 201, such that the connector 101 can be removed from the fastening assembly 100. The holding portion 603 of the clip 201 of the present disclosure has a compressible elastic structure (for example, the multiple annular structures as shown or a web structure of other types), such that the holding portion 603 can not only cooperate with the insertion portion 602 to achieve a fastening connection between the connector 101 and the fastening assembly 100, but also enable the insertion portion 602 to be withdrawn from the receiving channel 501 by means of compressing the holding portion 603, so as to achieve the removal of the connector 101. Furthermore, when the fastening assembly 100 of the present disclosure is used, the fastening operation of the connector 101 is also very simple, and only the operation of inserting the U-shaped connection portion of the connector 101 into the receiving channel 501 is needed.

Although only some features of the present disclosure are illustrated and described herein, those skilled in the art may make various improvements and changes. Therefore, it should be understood that the appended claims are intended to encompass all the above improvements and changes that fall within the substantial spirit and scope of the present disclosure.

The invention claimed is:

1. A fastening assembly, the fastening assembly comprising:
    a receiving seat, the receiving seat comprising a neck portion, a body portion and a receiving channel, the body portion being connected to the neck portion, the receiving channel extending through the neck portion, the neck portion comprising a first neck portion side wall and a second neck portion side wall located on opposite sides of the receiving channel and an opening arranged in the first neck portion side wall, and the opening being in communication with the receiving channel; and
    a clip, the clip comprising an operation portion, a holding portion, an insertion portion, and a pair of connection leg portions, the insertion portion being connected to the operation portion by the pair of connection leg portions, and the holding portion being connected to the operation portion, wherein the holding portion and the pair of connection leg portions are elastic, and the clip is configured to be removably clamped on the neck portion of the receiving seat;

wherein when the clip is mounted on the neck portion of the receiving seat, the insertion portion of the clip is at least partially inserted into the receiving channel through the opening in the first neck portion side wall, and the holding portion of the clip abuts against the second neck portion side wall of the neck portion; and wherein when a pushing force is applied to the operation portion toward the neck portion, the insertion portion is configured to be withdrawn from the receiving channel of the receiving seat, such that the clip is removable from the receiving seat.

2. The fastening assembly according to claim 1, wherein each connection leg portion of the pair of connection leg portions comprises a transverse branch leg connected to the insertion portion and a longitudinal branch leg connected between the transverse branch leg and the operation portion, the longitudinal branch leg, the transverse branch leg and the holding portion define a receiving opening, and the clip is clamped on the neck portion of the receiving seat through the receiving opening.

3. The fastening assembly according to claim 2, wherein the longitudinal branch leg comprises a curved section close to the transverse branch leg, and the curved section is curved toward the insertion portion.

4. The fastening assembly according to claim 1, wherein the holding portion has a compressible structure.

5. The fastening assembly according to claim 4, wherein the compressible structure comprises at least two annular structures, the at least two annular structures are connected between the pair of connection leg portions, and one of the at least two annular structures abuts against the second neck portion side wall of the neck portion.

6. The fastening assembly according to claim 1, wherein the insertion portion comprises an insertion section, the insertion section is configured to be inserted into the receiving channel through the opening in the first neck portion side wall, and a top face of a free end of the insertion section is an inclined face that is gradually inclined downward toward an end face of the free end.

7. The fastening assembly according to claim 6, wherein the insertion portion further comprises a support section, the insertion section is connected to the support section, the support section is connected to the pair of connection leg portions, and the support section is greater in size than that of the opening, such that the support section will not be inserted into the receiving channel along with the insertion section.

8. The fastening assembly according to claim 6, wherein the insertion portion further comprises a protruding portion extending out from the end face of the free end of the insertion section, the second neck portion side wall is further provided with an accommodation hole, and when the clip is mounted on the neck portion of the receiving seat, the protruding portion is received in the accommodation hole.

9. The fastening assembly according to claim 1, wherein the clip is integrally formed of a plastic material.

10. The fastening assembly according to claim 1, wherein the receiving channel of the receiving seat is used for receiving a connector that has a U-shaped connection portion.

* * * * *